Dec. 13, 1932.  F. C. GREENE  1,890,661

APPARATUS FOR CARBONIZING COAL AND LIKE MATERIAL

Filed Oct. 15, 1928    3 Sheets-Sheet 1

Inventor
Frank C. Greene,
By Chindahl Parker & Corlson
Attys.

Dec. 13, 1932.  F. C. GREENE  1,890,661
APPARATUS FOR CARBONIZING COAL AND LIKE MATERIAL
Filed Oct. 15, 1928  3 Sheets-Sheet 2
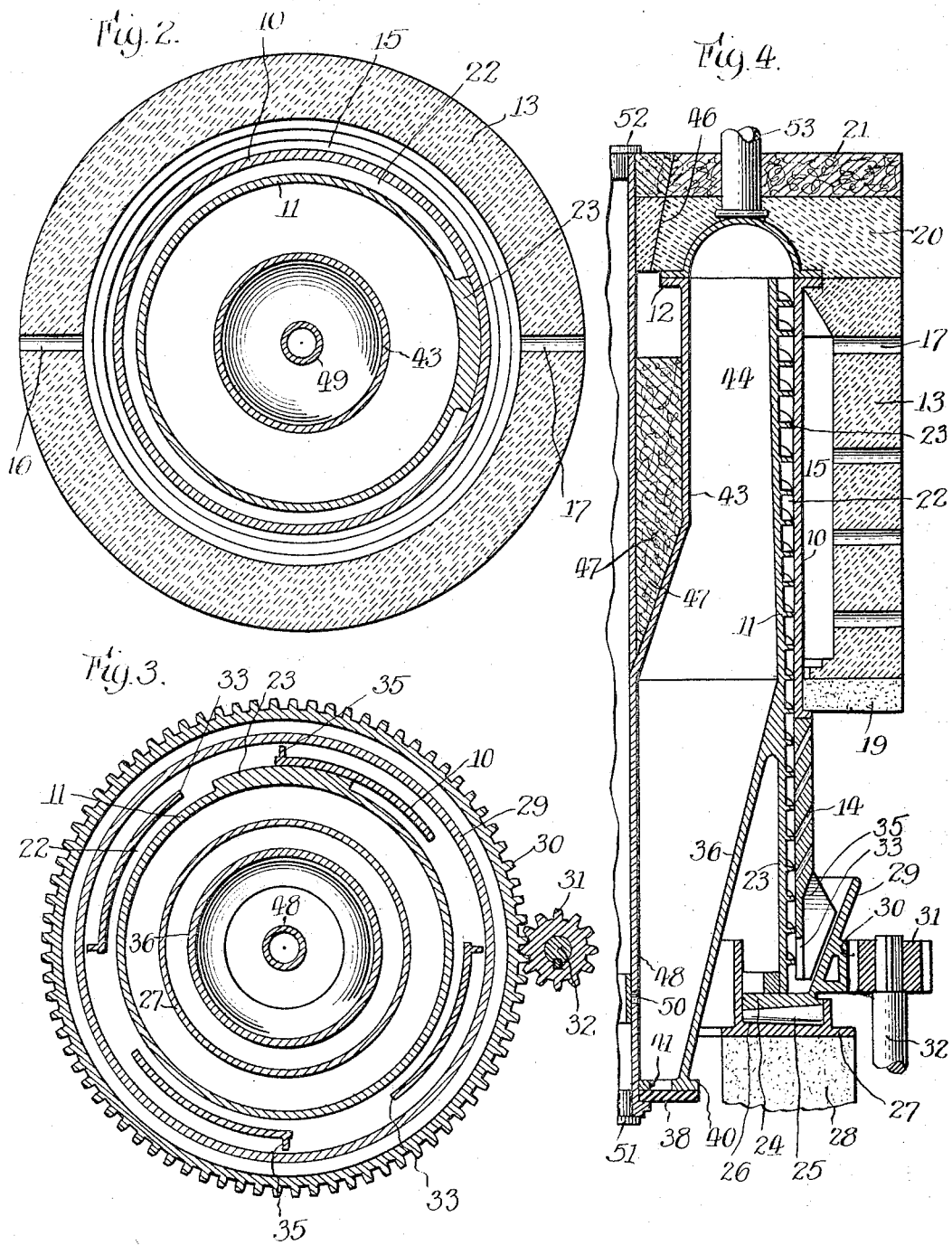
Inventor:
Frank C. Greene,
By Grindell Parker & Carlson,
Attys.

Dec. 13, 1932.  F. C. GREENE  1,890,661
APPARATUS FOR CARBONIZING COAL AND LIKE MATERIAL
Filed Oct. 15, 1928   3 Sheets-Sheet 3
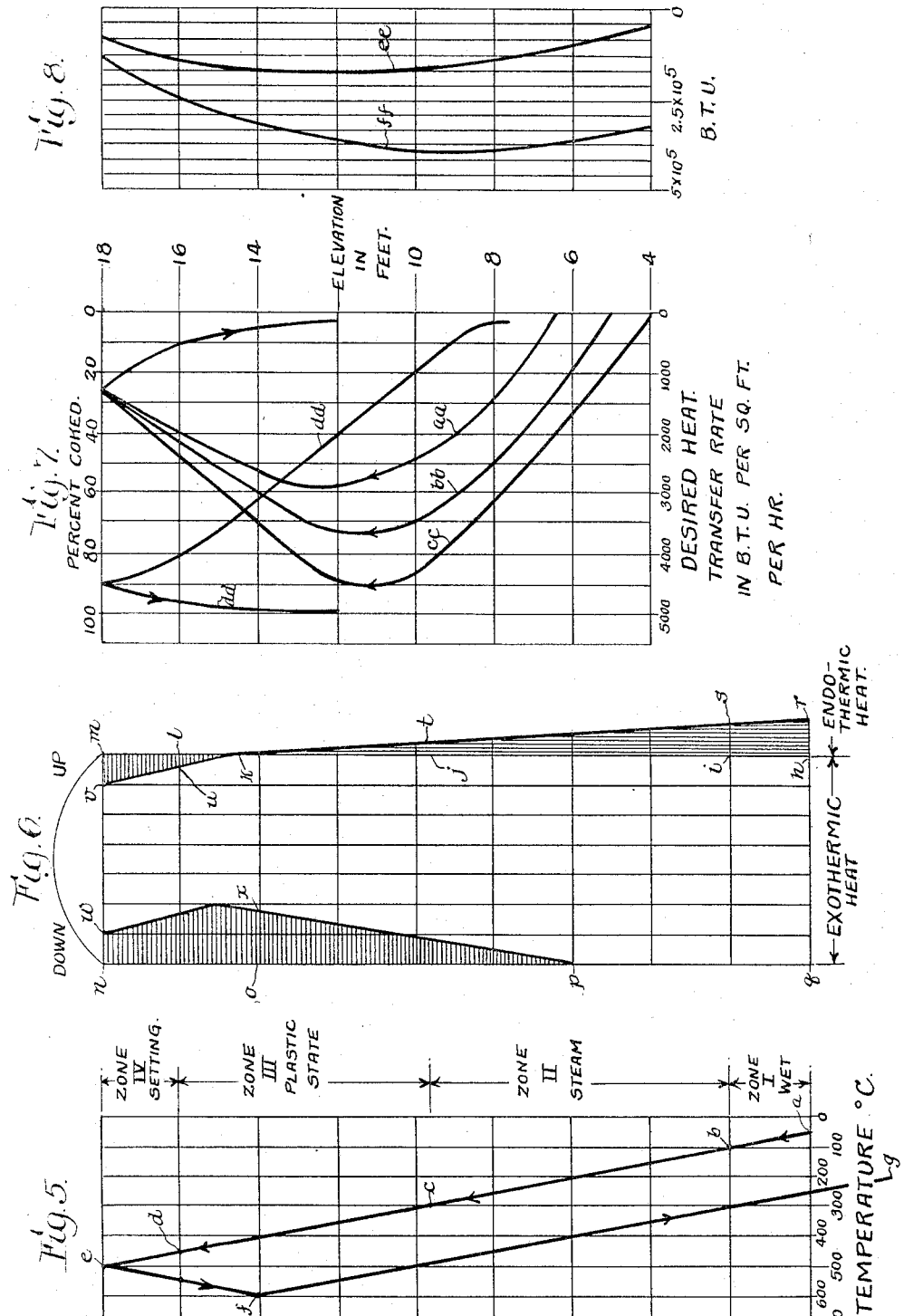
Inventor:
Frank C. Greene, Patented Dec. 13, 1932

1,890,661

UNITED STATES PATENT OFFICE

FRANK C. GREENE, OF CHICAGO, ILLINOIS

APPARATUS FOR CARBONIZING COAL AND LIKE MATERIAL

Application filed October 15, 1928. Serial No. 312,462.

The present invention relates to a new and improved apparatus for carbonizing coal and like material, and particularly as applied to low temperature carbonization.

In the process of carbonization, the coal or material to be treated is heated through a predetermined temperature gradient. This temperature gradient may be varied, it being much greater in the process of high temperature carbonization than in the process of low temperature carbonization. In the course of the process, first endothermic heat is required. This heat is utilized as sensible heat in raising the temperature of the material, as latent heat of vaporization for driving off the moisture and the residual volatile contents, and as latent heat of fusion for fusing the material. The material first fuses, i. e. becomes plastic, at from 300° C. to 400° C., and the fusion is accompanied by the decomposition of certain constituents, such as resinous compounds, into volatile matter which is copiously evolved from the mass. Decomposition with the attendant evolution of volatile constituents is accompanied with the evolution of heat, i. e. is an exothermic reaction, and occurs at different points in the temperature gradient from the point of fusion to approximately 600° C. These points are called exothermic points, and the first point is the most pronounced. After the exothermic points, the mass gradually sets, thereby giving off its latent heat of fusion. Because of the exothermic reactions, the supply of external heat can be discontinued shortly after the fusion, and the temperature will still continue to rise, and the process of carbonization will be carried to completion to form a rigid char, commonly called coke. The coke will be dense or porous depending on the degree of pressure to which the material is subjected when plastic.

The carbonization of coal is commonly carried out in externally heated retorts, and many different types have been provided. Thus, some retorts are for the batch process, and others are for the continuous process; some are vertical with either an upward or downward feed, and others are horizontal or inclined. A well known and commercial type of retort comprises a central axially disposed rotor having a helical screw on its outer periphery for conveying the material upwardly therethrough. The material thus passes upwardly between two heated walls through an annular chamber comprising from bottom to top a drying and preheating zone, a zone of plasticity, and a setting zone. The exothermic heat given out in the upper zones serves no useful purpose, and needlessly maintains the char at a high temperature which must be reduced to below the kindling temperature before the char is discharged to the atmosphere.

The primary object of the present invention therefore resides in the provision of a novel apparatus for carbonizing coal and like material which conserves the heat of the plastic material and utilizes same in the process, thereby incidentally reducing the temperature of the char leaving the apparatus.

The plastic material is scraped or plowed from the inner wall of the retort by the screw conveyor, but tends to adhere to the outside of the rotor. Obviously, if the material sticks to the rotor, propulsion will cease and the apparatus will become jammed. An important object of the invention therefore resides in the use of the exothermic heat in the char to heat the interior of the rotor. If the rotor in the region in which the material is plastic is maintained at the temperature at which the material becomes plastic, the material will not stick or adhere to the rotor.

Another object resides in the provision of a counterflow of the incoming material and the outgoing product whereby the heat in the latter is transferred in part to the former. This object is accomplished by conveying the material upwardly through the retort in which it is subjected to the necessary external heat, and discharging the plastic mass which may be starting to set and turning rigid to the interior of the rotor. The temperature of the mass while it is setting increases due to the giving off of exothermic heat, and then decreases as the mass moves downwardly toward the discharge end of the rotor. The heat from the mass in the rotor preheats the incoming material, and in the plastic zone prevents the material from adhering to the rotor.

Dry material will be propelled more quickly than wet material; and wet material will be propelled more quickly than plastic material. The incoming material may therefore apply considerable pressure on the material in the plastic zone, and if fed in too rapidly may even clog up the apparatus. The application of pressure to the plastic material tends to produce a dense hard char or coke. In some instances, a hard coke is desired, and in other instances, as in stokers, a light porous coke is desired. The pressure on the plastic material cannot be relieved by increasing the speed of propulsion of the material since the maximum speed is limited. Other objects of the invention therefore reside in one or more of the following features: to wit, passing of the steam generated from the moisture in the material downwardly through the incoming material so as to give up its latent heat of vaporization to preheat said material and to wet said material; a gradually widening space between the retort and the rotor in the plastic zone to relieve the pressure on the fused material and to prevent jamming; and louvres or inclined openings in the lower end of the retort for discharging steam and excess feed where a light porous coke is desired.

In the process of low temperature carbonization, the intensity of heat is not so important as the quantity of heat, the area over which it is applied, and the time interval during which it is applied. Heretofore, carbonizing retorts have been tall, large in size thus taking up valuable space, expensive, and costly in operation. Still other objects of the invention therefore reside in the provision of a carbonizing apparatus which comprises an inner hollow rotor adapted to receive the material from the outer retort thereby providing a large heating area and retaining a small overall size, which is simple and inexpensive in construction, and which is economical and efficient in operation.

A further object resides in the provision of novel gas take-off means, and of means for insuring a reduction of the discharge temperature to below the kindling point.

Further objects and advantages will become apparent as the description proceeds.

In the accompanying drawings, Figure 1 is a vertical sectional view, partially diagrammatic in character, illustrating an apparatus embodying the features of my invention.

Fig. 2 is a horizontal sectional view taken along line 2—2 of Fig. 1.

Fig. 3 is a horizontal sectional view taken along line 3—3 of Fig. 1.

Fig. 4 is a fragmentary view similar to Fig. 1 of one side of a modified form of apparatus.

Fig. 5 is an illustrative temperature graph, suitable legends indicating the general reactions occurring in the stages of the method.

Fig. 6 is an illustrative diagrammatic representation of the endothermic and exothermic heat in B. t. u. supplied to the material in the course of the process.

Fig. 7 is an illustrative graph illustrating the desired heat transfer rate in B. t. u. per square foot per hour.

Fig. 8 is an illustrative diagrammatic representation of the available heat in B. t. u. in the material in the rotor.

Figure 1:
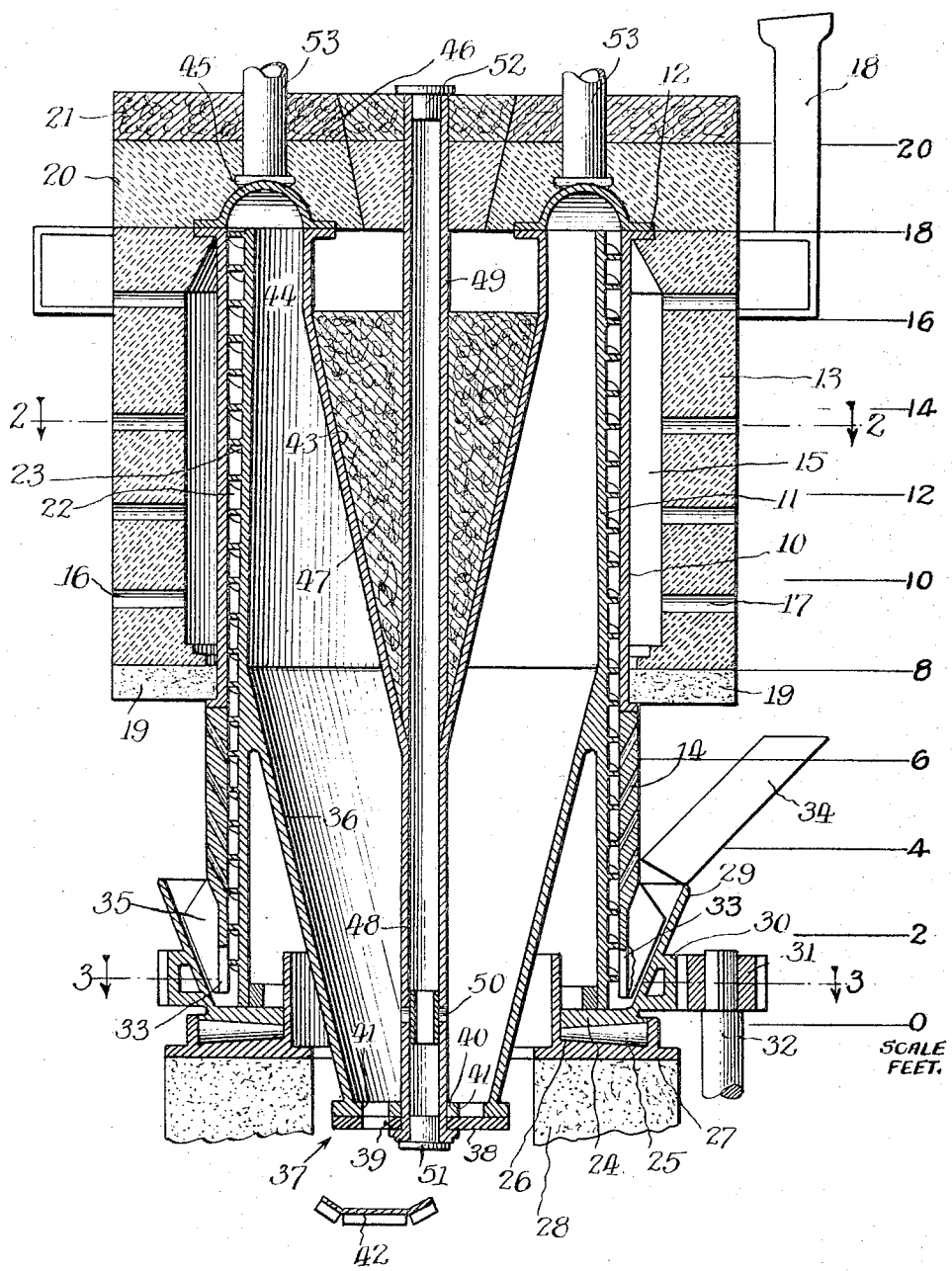

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the exemplary embodiment of the invention illustrated in the drawings, the apparatus may be provided in various forms, sizes and relative proportions of parts. However, for purposes of illustration, I have shown in Fig. 1, a scale A indicating vertical dimensions for convenience in designating the approximate vertical limits of different zones in the retort.

Preferably, the apparatus comprises an outside retort 10 and an internal concentric rotor 11, both being disposed vertically. The rotor 11 is adapted to propel the material upwardly through the retort in a predetermined path. This path includes a plurality of zones, which may not be sharply defined, but which for convenience are designated as zones I, II, III and IV. In zone I, the incoming material is first wetted by the condensation of steam descending from zone II, and in passing therethrough is preheated sufficiently to generate the moisture into steam at the upper limit. In zone II, the dry material is preheated to the temperature at which it starts to become plastic. This zone is filled with superheated steam which is forced to descend to zone I because of the seal effected by the plastic material in zone III. In zone III, the material becomes plastic, and certain resinous and other compounds are decomposed into various volatile constituents. Latent heat of fusion is required to render the material plastic, but the decomposition is an exothermic reaction, giving off heat. In zone IV, the plastic material sets to a rigid char, thereby giving up the latent heat of fusion. This zone may be wholly within the rotor 11, or may be partly within the rotor and partly outside thereof within the upper end of the retort 10. The foregoing zones are, therefore, designated respectively as the wet zone, the steam zone, the plastic zone, and the setting zone.

From the retort 10, the plastic, and in some instances the partially set material, is discharged into the upper end of the rotor 11 from where it passes downwardly to the discharge end of the rotor. The heat in the material in the rotor is utilized to maintain the rotor wall at a temperature high enough to prevent the plastic material in zones III and IV from adhering to the rotor wall, and is utilized to preheat the incoming material in zones I and II, thereby resulting in a decreasing temperature gradient in the char to a temperature below the kindling point thereof.

In the present instance, the retort 10 comprises an integral cylindrical member, preferably of cast iron. The retort may be supported in any suitable manner, and in the present instance is suspended by means of a peripheral flange 12 on its upper end from the upper end of a furnace wall 13. The lower end of the retort 10, below the wall 13, preferably is formed of refractory material, and is formed with a plurality of upwardly and outwardly inclined openings or louvres 14 which are arranged in vertically and peripherally spaced relation. These openings 14 may be luted from top to bottom to the desired point as will be hereinafter described.

Preferably, the furnace wall 13 defines an annular furnace chamber 15 about the upper portion of the retort, and is constructed of any suitable refractory material, such as brick work. Formed in the wall 13 are a plurality of flues 16 adapted to admit hot products of combustion from a suitable source (not shown) to the chamber 15, and flues 17 adapted to direct said products from said chamber to a suitable stack 18. The furnace wall may be supported in any suitable manner, and in the present instance, rests on a suitable supporting structure 19. Extending across and resting on the top of the furnace wall 13 is a top wall 20 which underlies a layer 21 of suitable heat insulating material.

The rotor 11 is substantially the same in length as the retort 10, and but slightly less in diameter so as to provide a small annular space 22 therebetween. Preferably, the rotor comprises an integral cylindrical iron casting, the upper end of which tapers slightly inwardly, thereby gradually increasing the width of the space 22. In the present instance, the taper begins approximately at the mid-point. Formed on the outer surface of the rotor 11 is a suitably pitched screw thread 23 of suitable form for elevating the material upwardly through the space 22. The width of the thread 23 is the same as that of the space 22, and hence increases slightly in the upper half.

Any suitable means may be provided for supporting and driving the rotor 11, and in the present instance I have shown the rotor resting on and rigid with a suitable drive ring 24. This ring is rotatable on a plurality of conical rollers 25 disposed in an annular race-way 26 formed in a base casting 27 resting on a foundation 28. Formed integral with the drive ring 24 and disposed about the lower end of the retort 10 is an annular hopper 29. A spur gear 30 is rigidly secured to the outer periphery of the hopper 29, and meshes with a pinion 31 on a suitable drive shaft 32.

The lower end of the retort is formed with a plurality of openings 33 at the inner end of the hopper 29. A spout 34 is adapted to supply the coal or material to be carbonized to the hopper 29. The retort is formed with vanes 35 on the outside for directing the material from the hopper 29 through the openings 33 into the space 22.

The interior of the rotor 11 is hollow and is adapted to receive the material leaving the upper end of the retort 10. The lower end of the rotor 11 is provided with a downwardly tapering hopper 36, the lower end of which is closed by a suitable discharge gate 37. Preferably, the gate 37 comprises a fixed gate member 38 having a discharge opening 39, and a rotary gate member 40 directly over the fixed member and secured to the lower end of the hopper 36 for rotation therewith and having a plurality of spaced discharge openings 41 adapted to be brought successively into registration with the opening 39. The opening 39 is located directly over a suitable conveyor 42 for carrying away the char discharged from the rotor 11 through the gate 37. It will be understood that the discharge of char should be proportional to the input of raw materials.

To confine the exothermic heat in the mass in the rotor 11 from escaping except through the wall of the rotor, a member 43 is provided extending centrally and axially into the upper end of the rotor. In the present instance, the member 43 is tubular at its upper end to define an annular space 44 in the upper end of the rotor, and is tapered downwardly to gradually increase the size of the space in the rotor. This member 43 is stationary with respect to the rotor 11, and in the present instance is supported by the retort through an annular supporting bracket 45, preferably semi-circular in cross-section. The outer periphery of the bracket rests on and is secured to the flange 12 of the retort, and the inner periphery is secured to the upper end of the member 43. The furnace wall 20 overlies the bracket 45 and the upper end of the member 43, and with the layer 21 is formed with a suitable opening 46 normally closed. Preferably, suitable insulating material 47 is provided in the conical portion of the member 43.

The insulating member 43 may be provided in various forms. Thus, the cylindrical portion may be relatively short and the tapered portion may be relatively long, as shown in Fig. 1. This form provides a high degree of insulation and a light porous product. On the other hand, the cylindrical portion may be relatively long and the tapered portion may be relatively short, as shown in Fig. 4. In this form, a higher pressure is applied to the material, thus resulting in a denser product. If the temperature becomes too high, the opening 46 may be uncovered so as to permit the escape of heat by radiation from the cylindrical portion of the member 43.

Extending axially through the rotor 11 from the member 43 to the gate member 38 which it supports is a hollow pipe 48. An excess heat discharge pipe 49 extends from the pipe 48 of which in effect it is a continuation through the member 43, the top wall 20 and the layer 21 of insulation. These pipes 48 and 49 are fixed, and may be used as a means for removing heat from the char in the lower end of the rotor by passing steam or air therethrough where the temperature of the char leaving the gate 37 would otherwise be above the kindling point. The pipes 48 and 49 may also be utilized in starting up the operation to admit air or discharge products of combustion when building a bed of fuel in the rotor, and to this end the pipe 48 is provided with suitable air ports 50 below the member 43, and normally closed. Normally, the outer ends of the pipes 48 and 49 are closed by removable plugs 51 and 52.

The volatile constituents evolved in the carbonizing process may be withdrawn in any suitable manner, and in the present instance are adapted to be withdrawn through a plurality of take-off pipes 53 opening to the upper side of the bracket 45 which communicates with both the retort and rotor.

The mode of operation will now be described, particular reference being had to Figs. 1, 5, 6, 7, and 8.

In Fig. 5, the temperature of the material in passing through the apparatus is represented by the line $a$—$b$—$c$—$d$—$e$—$f$—$g$, the temperatures being indicated on the abscissa, and the corresponding points in the apparatus being indicated on the ordinate. The zones are indicated at the sides of the graph, the legends on the right relating to line $a$—$b$—$c$—$d$—$e$, and the legends on the left relating to the line $e$—$f$—$g$.

In Fig. 6, the line $h$—$i$—$j$—$k$—$l$—$m$—$n$—$o$—$p$—$q$ represents the up and down path of the material in passing through the apparatus. Areas (vertical shading) on the outside of this line represent the quantity of endothermic heat and areas (horizontal shading) on the inside of the line represent the quantity of exothermic heat added to the material in the course of its passage through the apparatus.

To start the operation from a cold condition, the exterior of the retort 10 is heated by hot products of combustion in the furnace chamber 15, and the interior of the rotor may be heated initially by any suitable means. Preferably, a fire is built in the rotor. In this event the excess heat pipe 48 is used as a draft inlet, although it may be used as an outlet for the products of combustion. In this manner, the interior of the rotor is heated in the neighborhood of the insulating member 43 and the region in which the coal in the flighted space 22 normally becomes plastic.

During the normal operation, the material to be treated, which may be coal or like material, is supplied to the hopper 29 from where it enters through the openings 33 into the lower end of the space 22, and is then elevated by the screw conveyor 23.

As the material moves upwardly through zone I, it is wetted by the condensate of steam descending from above, and is gradually heated to the temperature of boiling water (100° C.), thereby driving off the moisture. The temperature change is represented by the line $a$—$b$ in Fig. 5, and the quantity of endothermic heat added is represented by the area $h$—$i$—$s$—$r$ in Fig. 6.

As the material is elevated through zone II, it is preheated to the point at which it starts to become plastic. In this zone, the material is in the presence of superheated steam which is forced to descend to zone I because of the seal produced by the plastic material in zone III. The temperature change is represented by the line $b$—$c$ in Fig. 5, and the quantity of endothermic heat is represented by the area $i$—$j$—$t$—$s$.

As the material is elevated through zone III, it becomes plastic, and certain resinous and other compounds are decomposed. The temperature at which the material becomes plastic is not sharply defined, and varies considerably, usually betwen 300° C. and 400° C., for different materials, and hence 300° C. has been arbitrarily selected as the starting point of fusion. Latent heat of fusion is required to render the material plastic. The evolution of the volatile ingredients, including the products of decomposition, is an exothermic reaction, and hence results in the giving up of heat after the action is initiated. The respective quantities of endothermic heat and exothermic heat given off in zone III are represented by the areas $j$—$k$—$t$ and $k$—$u$—$l$ in Fig. 6, and the temperature change is represented by the line $c$—$d$ of Fig. 5.

In zone III, the plastic mass effects a seal between the retort and the rotor, thus preventing the upward passage of steam from zone II. The steam is forced to descend, and to impart its latent heat of vaporization to the incoming material so as to preheat the latter.

Dry material is elevated faster than wet material; wet material is elevated faster than plastic material; plastic material cannot be elevated efficiently above a certain speed. The descending steam condensing on the material in zone I serves to prevent the material in said zone from invading the material in zone II. To prevent the material in zone II from invading the plastic material, which would result in clogging the apparatus, the width of the screw thread in zone III is increased. If necessary, excess feed can also be relieved through the louvers 14.

Upon a slight amount of additional heating the plastic mass begins to set to a rigid char, and in so doing gives up its latent heat of fusion. The decomposition of certain compounds in the material and the evolution of the volatile ingredients continues simultaneously, thus giving off additional exothermic heat. The precise point at which the plastic material begins to set varies widely for different materials, and for purposes of illustration is arbitrarily taken as 450° C., the starting point of zone IV. Of zone IV, preferably, the starting point is in the space 22 between the upper ends of the rotor and the retort, and the end point is in the upper end of the rotor.

The temperature change in zone IV is represented by the line $d$—$e$—$f$ in Fig. 5. At the end temperature of 600° C., the mass is completely set to a rigid char. In heating up to this temperature, various minor critical points are passed through, with the result that additional gases are given off. The exothermic heat given off in zone IV is represented by the areas $u$—$v$—$m$—$l$ and $o$—$n$—$w$—$x$ in Fig. 6.

In the normal low temperature carbonization of coal, after the exothermic reaction is initiated by the addition of external heat, no further external heat need be applied, since the exothermic heat given off in the reaction is sufficient to carry the process to completion, and may even result in a rise in temperature. Heat added in a substantial amount after the exothermic reaction is initiated and the plastic material begins to set serves no useful purpose, and makes it necessary to remove that much more heat in reducing the temperature of the char to below the kindling point before being discharged.

In Fig. 7, the desired heat transfer rate in B. t. u. per square foot per hour at different points along the path of the material through the apparatus is represented by curves $aa$, $bb$, and $cc$ of coals respectively containing 5%, 10% and 15% free moisture, the heat quantities being plotted on the abscissa, and the elevation in the retort and in the rotor being plotted on the ordinate. The corresponding extent to which the material is coked is represented by the curve $dd$, percentages being plotted on the abscissa. It will be evident that at elevation 18, in zone IV, but a small amount of heat is necessary to carry the process to completion, and that the material is about 90% coked. It is to be understood that these figures are only illustrative, and may vary for different materials.

It has been found that if the rotor is unheated in the region of plasticity, the plastic material will adhere to the rotor thereby resulting in difficulty of propulsion and often in jamming of the apparatus. To avoid this condition, it is desirable to heat the rotor to a temperature such that the plastic material will not adhere thereto.

The primary purpose of the present invention therefore resides in the utilization of the exothermic heat in the carbonized mass for the purpose of preheating the incoming material and also for the purpose of heating the rotor in the region of plasticity so as to prevent sticking of the plastic material thereto. This makes it possible to propel sticky material efficiently through a retort by means of a screw conveyor. Hence the partially set and partially plastic mass, which is giving up exothermic heat, is removed from the region of external heat and is dumped into the upper end of the rotor from where it is gradually lowered to the discharge gate 37 with a gradually decreasing temperature gradient. The exothermic heat in the mass supplies the small quantity of heat still necessary to complete the coking process.

The quantity of heat required to heat the rotor and the quantity of available heat in the rotor are represented by the curves $ee$ and $ff$ in Fig. 8 wherein B. t. u. are plotted on the abscissa and different elevations in the rotor are plotted on the ordinate.

The temperature drop in the rotor resulting from the transmission of heat from the char to the incoming material is represented by the line $f$—$g$ in Fig. 5, and quantity of exothermic heat utilized for heating the rotor is represented by the area $p$—$o$—$x$ in Fig. 6. At the lower end of the rotor the temperature of the char is below the kindling point, and the char is discharged through the gate 37 onto the conveyor 42.

It will be evident that I have provided a novel and highly advantageous means for carbonizing coal and like material. The counterflow of the incoming and outgoing materials results in a high thermal efficiency, in compactness of the apparatus and in a uniform product.

I claim as my invention:—

1. In an apparatus for carbonizing coal and like material, in combination, a vertical retort, a conveying rotor for passing material upwardly through said retort extending vertically within said retort, said rotor being hollow, means for heating the exterior of said retort, the upper end of said retort opening to the upper end of said rotor, and means for withdrawing the carbonized material from the lower end of said rotor.

2. In an apparatus for carbonizing coal and like material, in combination, a vertical cylindrical retort, a hollow concentric cylindrical rotor extending through said retort, means on said rotor for moving material through said retort, said rotor being adapted to receive the material from the upper end of said retort, and means for heating the exterior of said retort.

3. In an apparatus for carbonizing coal and like material, in combination, an elongated retort, means for heating said retort, a hollow rotor having external means within said retort and extending longitudinally thereof, said rotor for conveying material through said retort, one end of said rotor being adapted to receive the material from the discharge end of said retort, and means for removing the carbonized material from the other end of said rotor.

4. In an apparatus for carbonizing coal and like material, in combination, a vertical retort, a hollow conveying rotor extending vertically through said retort for passing material therethrough, and adapted to receive the material from the upper end of said retort, means for heating the exterior of said retort, and means for withdrawing gases of distillation and decomposition from said retort and said rotor.

5. In an apparatus for carbonizing coal and like material, in combination, an elongated retort, means for heating said retort, a hollow rotor having external vanes within said retort and extending longitudinally thereof, said rotor for conveying material through said retort, one end of said rotor being adapted to receive material from the discharge end of said retort, an insulating member extending into said end of said rotor, and discharge means at the other end of said rotor.

6. In an apparatus for carbonizing coal and like material, in combination, a vertical retort, a rotor vertically disposed in said retort in peripherally spaced relation thereto, means on said rotor for impelling material upwardly through said retort, means for feeding material to the lower end of said retort, and means for heating the upper end of said retort, the lower end of said retort being formed of refractory material and having louvres therein adapted to be left uncovered to cause excess feed to pass therethrough.

7. An apparatus for carbonizing coal and like material comprising, in combination, a vertical retort, a vertical concentric rotor in said retort having means for impelling material upwardly therethrough, means for feeding material to the lower end of said retort, means for heating the upper end of said retort, the lower end of said retort having louvres therein adapted to be left uncovered to cause excess feed to pass therethrough, said rotor being hollow to receive material from the upper end of said retort, and means substantially below the heated portion of said retort for discharging the material from said rotor.

8. In an apparatus for carbonizing coal and like material, in combination, an elongated retort, a rotor in said retort extending longitudinally thereof, means on said rotor for impelling material through said retort, a conical insulating member extending into one end of said rotor, a pipe extending centrally and axially through said rotor and said member, and means for heating said retort.

9. An apparatus for carbonizing coal and the like material comprising, in combination, a vertical cylindrical retort, a concentric cylindrical rotor extending through and defining an annular passage with said retort, means for supplying material to the lower end of said passage, a screw thread conveyor on said rotor for elevating material through said passage, said rotor being hollow to receive the material from the upper end of said retort, means for removing the material from the lower end of said rotor, and means for withdrawing gases from said retort and said rotor.

10. In an apparatus for carbonizing coal and like material, in combination, a vertical cylindrical retort, means for heating said retort, a concentric cylindrical rotor extending through said retort and defining an annular space therewith, an external peripheral thread on said rotor adapted to pass material upwardly through said space said rotor being hollow to receive the material from the upper end of said retort, an insulating member extending centrally into the upper end of said rotor and defining a peripheral space therewith, an annular member concaved downwardly opening over said spaces and bridging the upper ends of said retort and said insulating member, and means for withdrawing gases from said member.

In testimony whereof, I have hereunto affixed my signature.

FRANK C. GREENE.

CERTIFICATE OF CORRECTION.

Patent No. 1,890,661.  December 13, 1932.

FRANK C. GREENE.

It is hereby certified that error appears in the printed specification of the above numbered patent requiring correction as follows: Page 5, lines 129 and 130, claim 1, strike out the words "extending vertically within said retort" and insert the same after "rotor" in line 128; page 6, lines 18 to 20, claim 3, strike out the words "within said retort and extending longitudinally thereof, said rotor" and insert the same after "rotor" in line 18; same page, lines 39 to 41, claim 5, strike out the words "within said retort and extending longitudinally thereof, said rotor" and insert the same after "rotor" in line 39; and that the said Letters Patent should be read with these corrections therein that the same may conform to the record of the case in the Patent Office.

Signed and sealed this 21st day of February, A. D. 1933.

M. J. Moore, (Seal) Acting Commissioner of Patents.